United States Patent [19]

Allemand et al.

[11] Patent Number: 4,552,431
[45] Date of Patent: Nov. 12, 1985

[54] OPTICAL FIBERS WITH PLASTIC CORE AND POLYMER CLADDING

[75] Inventors: Louis-René Allemand, Limours; Jean Calvet, Paris; Jean-Claude Cavan, Vincennes; Jean-Claude Thevenin, Velizy, all of France

[73] Assignee: Commissariat a l'Energie Atomique, Paris, France

[21] Appl. No.: 528,479

[22] Filed: Sep. 1, 1983

[30] Foreign Application Priority Data

Sep. 23, 1982 [FR] France .................................. 82 16026

[51] Int. Cl.⁴ ............................................. G02B 5/172
[52] U.S. Cl. .................................. 350/96.34; 65/3.11; 350/96.31
[58] Field of Search ............... 350/96.29, 96.30, 96.31, 350/96.34, 320; 65/3.11; 264/1.5

[56] References Cited

U.S. PATENT DOCUMENTS

| | | | |
|---|---|---|---|
| 3,472,921 | 10/1969 | Fyfee ..................................... | 264/1.5 |
| 3,920,313 | 11/1975 | Wong et al. .................. | 350/96.34 X |
| 3,999,834 | 12/1976 | Ohtomo et al. ................... | 350/96.34 |
| 4,274,709 | 6/1981 | Asai .................................... | 350/96.34 |
| 4,458,986 | 7/1984 | Yuto et al. ..................... | 350/96.34 X |

FOREIGN PATENT DOCUMENTS 55-18881  5/1980  Japan ................. 350/96.34

OTHER PUBLICATIONS

Oikawa et al., "Plastic Optical Fibre with Improved Transmittance", *Electr. Lett.*, vol. 15, No. 25, Dec. 1979, pp. 829–830.

Kaino et al., "Low-Loss Polystyrene Core-Optical Fibers", *J. Applied Physics*, vol. 52, No. 12, Dec. 1981, pp. 7061–7063.

Chemical Abstracts, vol. 96, 1982, p. 575, abrege 43684a (Columbus, Ohio, U.S.).

*Primary Examiner*—John Lee

[57] ABSTRACT

Described are optical fibers having a core of plastic material, such as polystyrene, and a polymer covering of vinyl acetate or a fluorine-containing derivative of vinyl acetate, and a process for producing the same by drawing a bar of the same materials.

15 Claims, No Drawings

OPTICAL FIBERS WITH PLASTIC CORE AND POLYMER CLADDING

BACKGROUND OF THE INVENTION

The present invention relates to plastics optical fibers and to a process for producing the same. Such fibres, which can more particularly be index gradient fibres, are used for optical transmission, particularly in the medical, telecommunications, automobile and decorative fields.

These optical fibres are generally formed by a first material constituting the fibre core and a second material coating the first to form a fibre sheath or cladding. The core material in which the useful light energy is propagated, must have good light transmitting characteristics and has a refractive index higher than that of the or cladding sheath material.

In such optical fibres, the light is propagated by total reflection at the core-sheath interface. With this type of propagation, the light quantities which can be transmitted increase in proportion to the difference between the refractive indices of the core material and the sheath material.

Glass or silica are generally used as the core material, because they have good optical transmission properties. However, these fibres have the disadvantage of being expensive, heavy and not very flexible. Moreover, over the last few years, various attempts have been made to manufacture optical fibres from plastics.

The hitherto known plastics fibres are formed from transparent materials of the amorphous type, such as e.g. polymethyl methacrylate or PMMA, which is generally used as the core material.

Thus, PMMA has a high transparency and good flexibility, but has a relatively low refractive index (1.48–1.50), which makes it necessary to use a sheath material with a low refractive index. However, polymers with such a low index are extremely rare. One of the polymers which can be used is 2,2,2-trifluoroethyl polymethacrylate, which has a refractive index of approximately 1.41.

Optical fibres formed with this material and the sheath material and PMMA as the core material as well as their production process have been described in Japanese Pat. No. 56 8321 (1981).

Unfortunately, these optical fibres have a low transmissible light aperture angle. In addition, the quality of the core-sheath interface, where the total reflection takes place, is not very good, as a result of the production process used (coextrusion of double die).

BRIEF SUMMARY OF THE INVENTION

The present invention relates to plastics optical fibres making it possible to obviate these disadvantages.

According to the invention, these optical fibres comprising a core and a sheath, are characterized in that the sheath is mainly formed from a vinyl acetate polymer, or a fluorine-containing derivative of vinyl acetate.

These polymers have a relatively low optical index of 1.45 to 1.46 for polyvinyl acetate. They have a good transparency for the complete visible spectrum up to 350 nm in the ultraviolet. Moreover, the viscosity of these polymers is adaptable to that of the core material, because as a function of the degree of polymerization (number of monomers entering the polymer composition), the melting temperature can vary from 65° to 200° C.

According to an advantageous embodiment of the invention, the core is mainly formed from the polymer of a compound of formula:

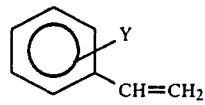

in which Y represents a hydrogen or an alkyl radical. Preferably the compound used is styrene.

These materials have high refractive indices and in the case of polystyrene the index is 1.58 to 1.62. The large index difference between the materials of the core (1.58–1.62) and the sheath (1.45–1.46) of the fibres favours the light transmission by them.

Moreover, the polymers of vinyl acetate and fluorine-containing derivatives of vinyl acetate have a good adhesive power with respect to the core materials, which is very important for obtaining a good core-sheath interface quality.

Moreover, the use of these core and sheath polymers makes it possible to obtain plastics optical fibres having a higher transmitted light aperture angle than those of the prior art, with the exception of polystyrene-silicone fibres, which constitute a laboratory construction because, although silicone has an affinity for silica, it has no adhesion to organic compounds.

According to the invention, the introduction of certain doping agents into the core material, makes it possible to obtain optical fibres having scintillation or fluorescence properties.

Preferably these doping agents are 2-(4-tert-butyl-phenyl)-5-(4-biphenylyl)-1,3,4-oxadiazole, hereinafter referred to by the abbreviation butyl.PBD and 1,4-di-[2-(4-methyl-5-phenyloxazolyl)]-benzene, hereinafter referred to under the abbreviation dimethyl.POPOP.

The invention also relates to a process for the production of optical fibres, particularly those described hereinbefore.

This process is performed by the gravity stretching or drawing of a blank constituted by a core material bar and a sheath material layer. Preferably, the blank is stretched during the passage in an oven, without any mechanical contact.

By producing a blank by covering the core material with a sheath material makes it possible during the following operations of the process, to protect the core-sheath interface of the optical fibre.

Preferably, the core material bar is produced by a polymerization process, followed by heat treatment, the latter improving the surface state between the core and sheath material. It also makes it possible to eliminate the mechanical stresses which have occurred during polymerization.

The sheath material is constituted by a polymer, or a mixture of two polymers having different viscosities, in order to adapt the viscosity of the sheath material to that of the core material. This adaptation of the viscosity of the sheath material makes it possible to stretch the core and sheath materials at the same speed and consequently facilitate the blank stretching stage.

DETAILED DESCRIPTION OF THE INVENTION

Other features and advantages of the invention can be gathered from reading the following description, which is intended in a purely illustrative manner.

According to the invention, the optical fibre sheath material is generally constituted by polyvinyl acetate, or by a polymer of a fluorine-containing derivative of vinyl acetate, such as vinyl trifluoroacetate. Moreover, the core material is preferably constituted by the polymer of a compound of formula:

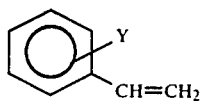

in which Y represents a hydrogen or an alkyl radical, such as e.g. $CH_3$.

In an exemplified manner, a description is provided hereinafter of the production of an optical fibre, whose core material is polystyrene (Y=H in the above formula) and whose sheath material is polyvinyl acetate. Obviously this production process is applicable to any core material and more particularly to polyvinyl toluenes (Y=$CH_3$ in the above formula) and to any other sheath material, particularly vinyl trifluoroacetate.

The first stages of the process consist of producing a polystyrene bar, which is obtained by polymerizing polystyrene in a glass ampoule, sealed under vacuum after degassing. The styrene can be purified by distillation under low pressure and at low temperature (approximately 40° C.), in the presence of a neutral gas (nitrogen or argon) and by eliminating the products obtained at the start and finish of distillation. The polymerization is continued as mass polymerization by heating, particularly by placing the ampoule in an oven operating with an adequate thermal cycle extending over 4 days and between 90° and 170° C., e.g. for 24 hours at 90° C. and then 24 hours at 170° C. On returning to ambient conditions, the ampoule is broken.

After annealing at approximately 80° C. can be carried out to eliminate the mechanical stresses which have appeared during polymerization. Annealing is followed by surface glazing of the bar, i.e. the latter is passed into an infrared oven, at a temperature of approximately 160° C., in order to bring about a surface fusion. Glazing makes it possible to obtain a polystyrene bar, with an almost perfect surface.

Optical fibres with scintillating or fluorescent properties are obtained by mixing scintillating or fluorescent doping agents with the pure styrene before carrying out polymerization. The doping material can be approximately 1% by weight butyl PPD and approximately 0.01% by weight dimethyl POPOP.

The following stage of the process consists of producing a blank, by covering the doped or undoped polystyrene bar with polyvinyl acetate. The polyvinyl acetate used can be those manufactured by Rhone Poulenc and marketed under the name Rhodopas. Coating can be obtained by immersing the polystyrene bar in a solution containing polyvinyl acetate and ethanol, the latter acting as the solvent, followed by raising the bar at a slow speed. The thickness of the polyvinyl acetate coating obtained is dependent on the bar raising speed and on the viscosity of the solution. During raising, the blank obtained is introduced into an oven at approximately 40° C., in order to dry the blank and eliminate the solvent. This operation can be carried out a number of times in succession, in order to obtain a final relatively thick coating (0.5 mm).

The covering of the doped or undoped polystyrene bar with this polyvinyl acetate coating makes it possible to obtain a polyvinyl acetate-polystyrene interface, i.e. a core-sheath interface of the protected fibre throughout the remainder of the operation. This makes it possible to obtain optical fibres having a good interface quality.

The following stage of the process consists of slowly drawing or stretching by gravity the thus obtained blank, by heating it in an oven. For example, the blank obtained is lowered at a speed of 2 cm/min. into a two-stage oven, comprising a preheating column which forms the first stage, and a heating zone by infrared heating and hot nitrogen scavenging, which constitutes the second stage. Preheating makes it possible to reach a temperature close to the drawing or stretching temperature. Infrared heating makes it possible to heat homogeneously up to the centre of the blank. The hot nitrogen makes it possible to control the surface temperature. By using this oven, it is possible to stretch large diameter blanks, i.e. with a diameter of approximately 56 mm.

In order to facilitate the drawing or stretching stage, it is possible to adapt the polyvinyl acetate viscosity to the polystyrene viscosity, i.e. make it close to the latter. This adaptation can be brought about by mixing in solution at least two vinyl acetate polymers having different viscosities and consequently the different melting temperatures required for stretching. For example, it is possible to prepare a solution containing 30% by weight of Rhodopas M (melting point 100°±5° C.), 30% by weight of Rhodopas HH (melting point 180°±10° C.) and 40% by weight of ethanol.

The thus obtained optical fibre can then be covered with a protective mechanical sheath.

Using such a production process, regular, cylndrical optical fibres of polyvinyl acetate and polystyrene with a diameter of 0.5 to 2 mm have been obtained—the latter values not being limitative. These fibres have light transmission values comparable or better than those of the plastics optical fibres according to the prior art.

In the case of a 2 mm diameter optical fibre, illuminated at the entrance by the diffused red light of a helium-neon laser tuned to 633 nm, a transmission of 60% for 10 m, i.e. 95%/m of fibre has been reproducibly obtained. In scintillation, for a 2 mm diameter fibre, containing 1% by weight of butyl PBD and 0.01% by weight of dimethyl POPOP, a transmission of 80%/m was obtained for the light emitted by dimethyl POPOP (430 nm).

In addition, the optical fibres obtained have a theoretical aperture angle of the transmittable light at the fibre outlet higher than those of the prior art optical fibres: ±25° to 29° for the optical fibres of the aforementioned Japanese Patent and ±37° to 46° for the optical fibres according to the invention, which corresponds to a double solid angle ($2\pi(1-\cos\theta)$).

With regards to the adhesion of the sheath material to the core material, microscopic observations on a fibre section in the case where a solvent common to polystyrene and to Rhodopas is introduced into the coating bar, revealed no clearly defined boundary between the core material and the sheath material. Thus, there is an interpenetration of these materials and consequently an index gradient at the interface. This interpenetration of the materials can be checked at the time of forming the blank by using higher concentrations of the common solvent on the one hand (e.g. ethyl acetate) and by lengthening the immersion period on the other.

Thus, such a process makes it possible to produce more particularly index gradient fibres. In telecommunications, the essential interest of such fibres is that they prevent the time dispersion of signals. In the physics of particles, index gradient scintillating fibres could lead to advances in the accuracy of transit time measurements.

What is claimed is:

1. Plastic optical fibers comprising a core formed by a polymer of a compound having the formula:

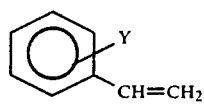

in which Y is hydrogen or alkyl; and a cladding consisting essentially of a polymer selected from the group consisting of at least one vinyl acetate polymer and at least one fluorinated derivative of vinyl acetate.

2. Optical fibers according to claim 1, wherein said fluorinated derivative is vinyl trifluoroacetate.

3. Optical fibers according to claim 1 wherein said core is polystyrene.

4. Optical fibers according to claim 1, wherein said fibers are index gradient fibers.

5. Optical fibers according to claim 1 having scintillation or fluorescence properties, wherein said core contains a scintillating or fluorescent doping agent.

6. Optical fibers according to claim 5, wherein said doping agents are selected from the group consisting of 2-(4-tert-butylphenyl)-5-(4-biphenylyl)-1,3,4-oxadiazole (butyl PBD) and 1,4-di-[2-(4-methyl-5-phenyloxazolyl)]-benzene (dimethyl POPOP).

7. Plastic optical fibers comprising a core and a cladding, said cladding consisting essentially of a polymer selected from the group consisting of vinyl acetate and a fluorinated derivative of vinyl acetate.

8. Optical fibers according to claim 7 having scintillation or fluorescence properties, wherein said core contains a scintillating or fluorescent doping agent.

9. Optical fibers according to claim 8, wherein said doping agent is selected from the group consisting of 2-(4-tert-butylphenyl)-5-(4-biphenylyl)-1,3,4-oxadiazole (butyl PBD) and 1,4-di-[2-(4-methyl-5-phenyloxazolyl)]-benzene (dimethyl POPOP).

10. A process for the production of plastic optical fibers having a core and a cladding, comprising performing a bar of plastic core material and coating the same with a cladding material consisting essentially of a polymer selected from the group consisting of at least one vinylacetate polymer and at least one fluorinated derivative of vinylacetate, and drawing by gravity, the so-coated preform.

11. A process according to claim 10, wherein said preform is drawn during passage through an oven, without any mechanical contact.

12. A process according to claim 10, wherein the cladding material is formed by two polymers having different viscosities in order to adapt the resulting viscosity of the cladding material to that of said core material.

13. A process according to claim 10, wherein the core bar is produced by polymerization followed by heat treatment.

14. A process according to claim 13, for optical fibers having scintillation or fluorescence properties, wherein prior to polymerization, scintillating or fluorescent doping agents are incorporated into said core material.

15. A process according to claim 10, wherein said core material is polystyrene.

* * * * *